(12) United States Patent
Kim et al.

(10) Patent No.: US 8,009,742 B2
(45) Date of Patent: Aug. 30, 2011

(54) METHOD AND SYSTEM FOR RETRANSMITTING INTERNET PROTOCOL PACKET FOR TERRESTRIAL DIGITAL MULTIMEDIA BROADCASTING SERVICE

(75) Inventors: Sung-Kee Kim, Suwon-si (KR); Do-In Choi, Yongin-si (KR); Yong-Gyoo Kim, Seoul (KR); Yun-Je Oh, Yongin-si (KR); Seong-Taek Hwang, Pyeongtaek-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 569 days.

(21) Appl. No.: 11/900,873

(22) Filed: Sep. 12, 2007

(65) Prior Publication Data

US 2008/0062998 A1    Mar. 13, 2008

(30) Foreign Application Priority Data

Sep. 12, 2006  (KR) ................. 10-2006-0088025

(51) Int. Cl.
*H04N 11/02*    (2006.01)
*H04N 7/20*     (2006.01)
*H04N 7/173*    (2011.01)
*H04N 7/16*     (2011.01)
*H04J 3/16*     (2006.01)

(52) U.S. Cl. ................ 375/240.28; 375/240.26; 725/73; 725/114; 725/131; 725/144; 725/151; 370/466

(58) Field of Classification Search ............. 375/240.26, 375/240.28; 725/105, 73, 114, 131, 144, 725/151; 370/466
See application file for complete search history.

(56) References Cited

U.S. PATENT DOCUMENTS

| 7,061,942 | B2 * | 6/2006 | Noronha et al. | 370/537 |
| 7,570,692 | B2 * | 8/2009 | Ahn et al. | 375/240.28 |
| 2006/0146854 | A1 * | 7/2006 | Park | 370/428 |
| 2008/0031151 | A1 * | 2/2008 | Williams | 370/252 |

OTHER PUBLICATIONS

Manfred Weihs, Design Issues for Multimedia Streaming Gateways, Apr. 23-29, 2006, IEEE, Networking, International Conference on Systems and International Conference on Mobile Communications and Learning Technologies, 2006.*

Chunlei Liu, Multimedia Over IP: RSVP, RTP, RTCP, RTSP, Jan. 15, 1998, http://www.cis.ohio-state.edu/~jain/cis788-97/ip_multimedia/index.htm.*

* cited by examiner

*Primary Examiner* — Hoang-Vu A Nguyen-Ba
(74) *Attorney, Agent, or Firm* — Cha & Reiter, LLC

(57) ABSTRACT

A system and method for retransmitting an Internet protocol packet for terrestrial digital multimedia broadcasting (DMB) service are provided, in which a PES packetizer and an MPEG-2 TS multiplexer are removed; video, audio, and data signals are individually carried by RTP packets; and a receiver extracts object clock reference (OCR) included in a MPEG-4 SL, and synchronizes a system clock and controls buffers by means of the OCR.

10 Claims, 4 Drawing Sheets

METHOD AND SYSTEM FOR RETRANSMITTING INTERNET PROTOCOL PACKET FOR TERRESTRIAL DIGITAL MULTIMEDIA BROADCASTING SERVICE

CLAIM OF PRIORITY

This application claims priority to application entitled "Method And System For Retransmitting Internet Protocol Packet For Terrestrial Digital Multimedia Broadcasting Service," filed with the Korean Intellectual Property Office on Sep. 12, 2006 and assigned Serial No. 2006-88025, the contents of which are incorporated herein by reference.

BACKGROUND OF THE INVENTION

1. Field of the Invention

The present invention relates to terrestrial digital multimedia broadcasting (DMB) service, and more particularly to a method and system for retransmitting an Internet protocol (IP) packet.

2. Description of the Related Art

Generally, in order to receive DMB service, a separate DMB receiver is required as it is not possible to receive a DMB signal through a general Internet Protocol (IP)-based wired/wireless network in which there is no DMB receiver. In order to enable DMB service to be provided through the general IP-based wired/wireless network, studies have been conducted in transmitting IP-encapsulating DMB data, which includes Motion Picture Expert Group-2 Transport Stream (MPEG-2 TS) and MPEG-4 Synchronization Layer (SL).

According to a retransmission system using a packet scheme for a DMB service developed through the studies, a terminal supporting the packet scheme without a separate DMB receiver can receive DMB data through a device having a DMB data decoding function and output DMB.

Hence, as described above, the user can be provided with terrestrial DMB service through a general terminal capable of accessing an IP network, even without a terrestrial DMB service-dedicated terminal. This enables the user to be provided with the terrestrial DMB service in an area where a terrestrial DMB base station is not installed, and in an area where it is not possible to receive DMB service because DMB signals are insufficient but it is possible to receive IP service.

FIG. 1 is a block diagram illustrating the configuration of a video multiplexer for terrestrial DMB. In the case of terrestrial DMB, video (MPEG-4 AVC), audio (MPEG-4 BSAC), and data information (Binary Format for Scene; BIFS) signals are packetized into a packetized elementary stream (PES), which is multiplexed together with Program Specific Information (PSI) to produce an MPEG-2 TS packet. In order to enhance the transmission quality of the signal packetized as described above, a frame error correction (FEC) signal is added to the packetized signal to produce a final video service stream, which is packetized according to Eureka-147 and transmitted.

In more detail, a video encoder 101 generating video data employs H.264/MPEG-4 Part 10 AVC (Advanced Video Coding) base profile level 1.3 for compression of a moving image, and an audio encoder 102 employs a bit-sliced arithmetic coding (BSAC) scheme included in MPEG-4 Part 3 for compression of audio which is accompanied by the video. Also, in the terrestrial DMB, a BIFS generator 103 employs a BIFS (Binary Format for Scenes) Core 2D graphic profile included in the MPEG-4 Part 1 system in order to provide a data broadcast function.

Each of Video data (ES), audio data (ES), and BIFS data information, which have been generated by the video encoder 101, the audio encoder 102, and the BIFS generator 103, is encapsulated into an MPEG-4 synchronization layer (SL) by an encapsulator 130. Thereafter, the video SL packet, audio SL packet, and BIFS SL packet are converted into an MPEG-2 TS through a PES packetizer 140 and a TS multiplexer 150, in which the PES packetizer 140 packetizes the video SL packet, audio SL packet, and BIFS SL packet to generate a PES packet according to the MPEG-2 standard, and the TS multiplexer 150 multiplexes the PES packet together with Program Specific Information (PSI) to produce an MPEG-2 TS packet.

According to the conventional method for converting a terrestrial DMB service stream of FIG. 1 into an IP packet, a TS packet generated through the PES packetizer 140 and TS multiplexer 150 is converted into an IP stream through an RTP/RTCP (Real-Time Transport Protocol/Real-Time Transport Control Protocol) packetizer 270 and a UDP/IP (User Datagram Protocol/Internet Protocol) packetizer 280, and then the IP stream is transmitted, as shown in FIG. 2. The RTP/RTCP contributes to packetization of multimedia signals, such as video and audio signals, so that the multimedia signals can be suitable for real-time transmission, and is widely used in an IPTV being currently provided. An FEC unit shown in FIG. 1 is used to provide a desired transmission quality because the reliability of a Digital Audio Broadcasting (DAB) network is poor. Such an FEC unit may be added also to the configuration of FIG. 2 if the reliability of a corresponding network is poor.

However, the conventional transmission method uses both MPEG-4 SL and MPEG-2 TS, as described above. These MPEG-4 SL and MPEG-2 TS have many duplicated functions, so the efficiency of the network may be degraded. The reason why the terrestrial DMB inefficiently uses duplicated functions in this way is that the SL layer must be used in order to synchronize video, audio, and data signals, compressed in MPEG-4, with each other, and additionally the MPEG-2 TS is used in view of its proven reliability.

SUMMARY OF THE INVENTION

Accordingly, the present invention has been made to solve the above-mentioned problems occurring in the prior art and provides additional advantages, by providing a method and system for retransmitting an Internet protocol packet for terrestrial digital multimedia broadcasting service, which enables a system to be more easily implemented and to operate more efficiently.

In accordance with an aspect of the present invention, a system for retransmitting an Internet protocol packet for terrestrial digital multimedia broadcasting (DMB) service includes: a transmitting-side apparatus for encoding video, audio, and data information for the DMB service in an MPEG-4 scheme, encapsulating the encoded information into an MPEG-4 synchronization layer (SL), and carrying the encapsulated information, together with Program Specific Information (PSI), by packets of an RTP/RTCP (Real-Time Transport Protocol/Real-Time Transport Control Protocol) scheme; and a receiving-side apparatus for receiving each of the packets from the transmitting-side apparatus, and performing a decapsulation based on the RTP/RTCP scheme, an MPEG-4 SL decapsulation, and a decoding with respect to each received packet, thereby restoring the original video, audio, and data information for the DMB service.

In accordance with another aspect of the present invention, a method for retransmitting an Internet protocol packet for terrestrial digital multimedia broadcasting (DMB) service includes: encoding, by a transmitting-side apparatus, audio, and data information for the DMB service in an MPEG-4 scheme, encapsulating the encoded information into an MPEG-4 synchronization layer (SL), and transmitting each of the encapsulated information, together with Program Specific Information (PSI), an RTP/RTCP (Real-Time Transport Protocol/Real-Time Transport Control Protocol) scheme; and decapsulating, by a receiving-side apparatus, each packet received from the transmitting-side apparatus according to the RTP/RTCP scheme, and performing an MPEG-4 SL decapsulation and a decoding with respect to each packet decapsulated according to the RTP/RTCP scheme, thereby restoring the original video, audio, and data information for the DMB service.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Hereinafter, an embodiment of the present invention will be described with reference to the accompanying drawings. In the below description, many particular items such as a detailed component device are shown, but these are given only for providing the general understanding of the present invention. It will be understood by those skilled in the art that various changes in form and detail may be made within the scope of the present invention.

An Internet protocol packet retransmission system for terrestrial digital multimedia broadcasting (DMB) service according to the present invention may be classified into a transmitting-side apparatus and a receiving-side apparatus. The transmitting-side apparatus encodes video, audio, and data information for DMB service according to an MPEG-4 scheme, encapsulates the encoded information into an MPEG-4 synchronization layer (SL), and carries the encapsulated information, together with Program Specific Information (PSI), by packets of an RTP/RTCP (Real-Time Transport Protocol/Real-Time Transport Control Protocol) scheme. The receiving-side apparatus receives each of the packets from the transmitting-side apparatus, and sequentially performs a decapsulation operation based on the RTP/RTCP scheme, an MPEG-4 SL decapsulation operation, and a decoding operation with respect to each received packet, thereby restoring the original video, audio, and data information for the DMB service. Hereinafter, the transmitting-side apparatus and receiving-side apparatus will be described in more detail with reference to FIGS. 3 and 4, respectively.

Figure 1:
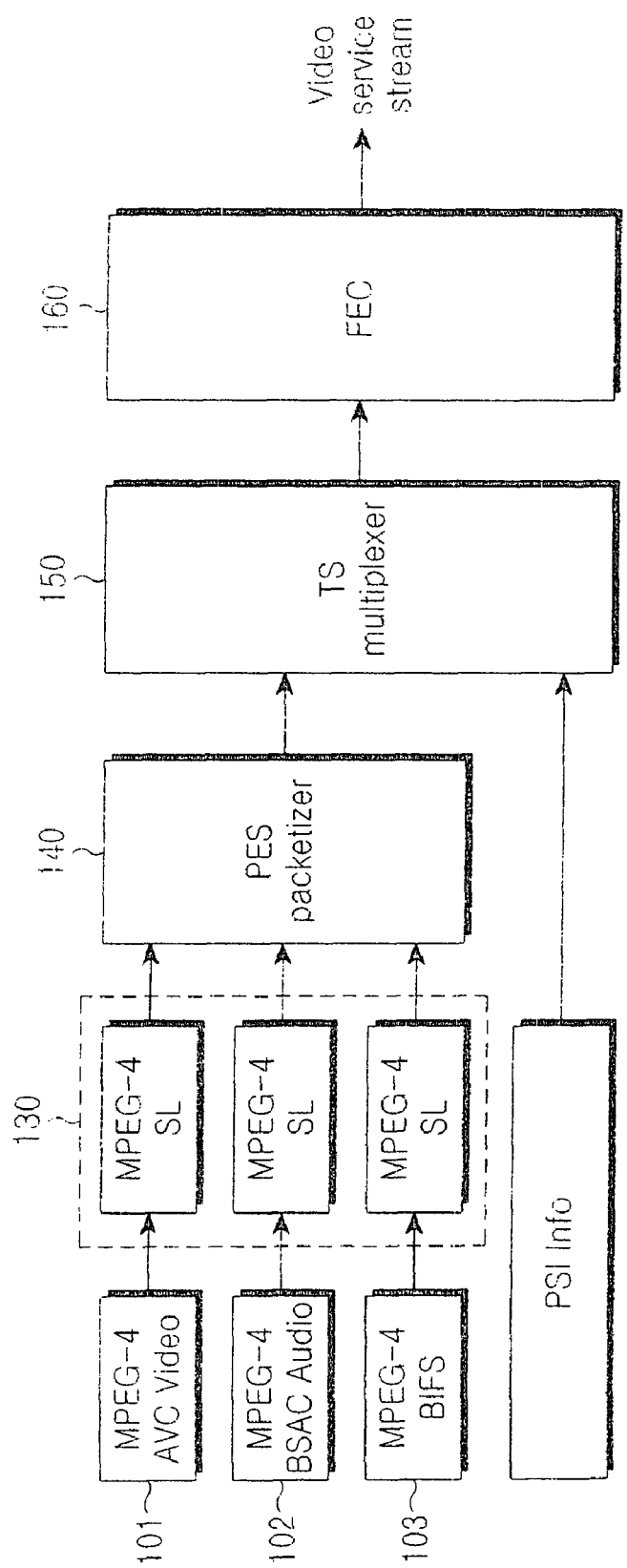
FIG. 1 is a block diagram schematically illustrating the configuration of a conventional video multiplexer for terrestrial DMB.
Figure 2:
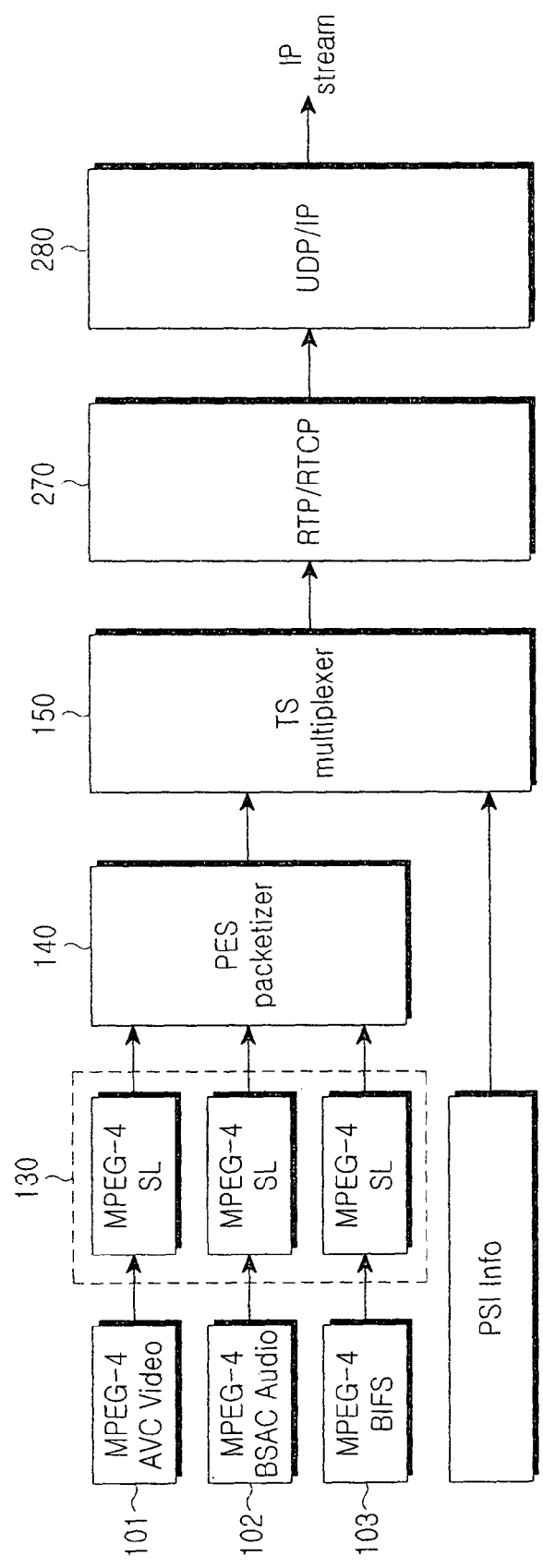
FIG. 2 is a block diagram schematically illustrating the configuration of a conventional IP packetizing apparatus for DMB signals.
Figure 3:
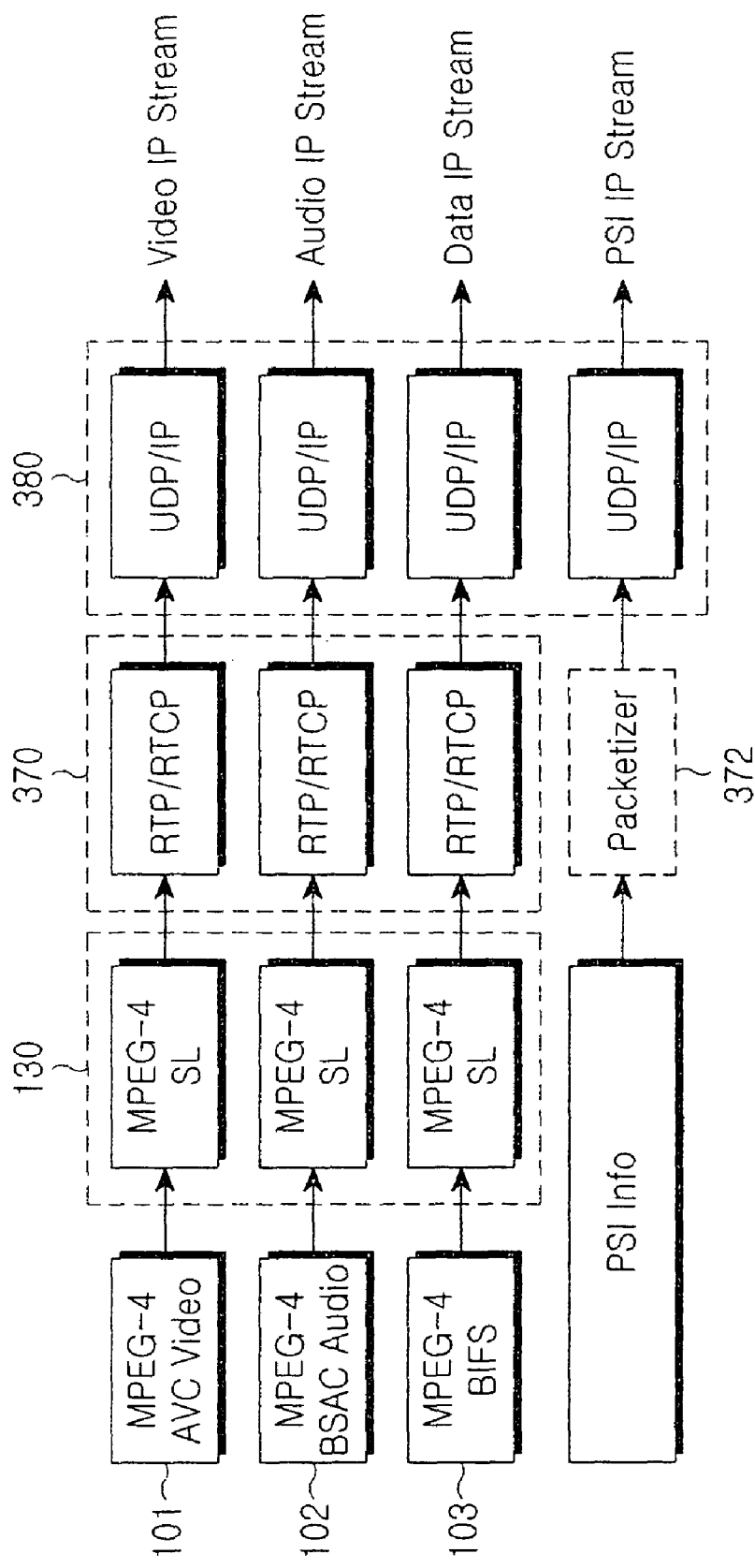
FIG. 3 is a block diagram schematically illustrating the configuration of an IP packetizing apparatus for terrestrial DMB signals according to an embodiment of the present invention.

FIG. 3 is a block diagram schematically illustrating the configuration of an IP packetizing apparatus, i.e., a transmitting-side apparatus, for terrestrial DMB signals according to an embodiment of the present invention. As compared with the conventional configuration shown in FIG. 2, the transmitting-side apparatus according to the embodiment of the present invention is configured to carry video, audio, and data signals by the respective RTP packets, while removing the PES packetization unit and the MPEG-2 multiplexer.

In more detail, a video encoder 101 generates video data according to the MPEG 4 scheme, and an audio encoder 102 generates audio data according to the MPEG-4 scheme. Also, a BIFS generator 103 generates BIFS data. In this case, as shown in FIG. 3, video, audio, and BIFS information input to the video encoder 101, the audio encoder 102, and the BIFS generator 103 are provided from a separate TDMB receiver (not shown) receiving a terrestrial DMB signal. Such a TDMB receiver obtains video, audio and BIFS information from a received DMB service stream, and provides the video, audio, and BIFS information to the IP packetizing apparatus for DMB signals according to an embodiment of the present invention. The configuration and operation of such a TDMB receiver are the same as those of the conventional TDMB receiver, so a detailed description thereof will be omitted to avoid redundancy.

Referring again to FIG. 3, in the IP packetizing apparatus for DMB signals according to an embodiment of the present invention, video data, audio data, and data information generated by the video encoder 101, the audio encoder 102, and the BIFS generator 103 are individually encapsulated into an MPEG-4 synchronization layer (SL) by an encapsulator 130. Thereafter, according to the characteristics of the present information which is different from the prior art, a video SL packet, an audio SL packet, and a BIFS SL packet are provided to an RTP/RTCP packetizer 370 so as to be RTP/RTCP-packetized, respectively. Then, the output of the RTP/RTCP packetizer 370 is provided to a UDP/IP packetizer 380, thereby being transmitted as a video IP stream, an audio IP stream, and a data IP stream.

Meanwhile, Program Specific Information (PSI) is RTP/RTCP-packetized through a PSI packetizer 372, which is separately provided according to an embodiment of the present invention, and then provided to the UDP/IP packetizer 380. Thereafter, the UDP/IP packetizer 380 generates a separate PSI IP stream from the received RTP/RTCP-packetized information.

As described above, according to the embodiment of the present invention, information including PSI is transmitted through a separate IP packet. This is because, while a method for carrying an MPEG-4 signal by an RTP is clearly mentioned in RFC 3640 or RFC 3984, there is yet no standardized method of carrying PSI by an RTP. The PSI to be transmitted may include an object descriptor (OD) and an "SLConfigDescriptor," which is information about an SL packet configuration, and preferably may additionally include EPG information.

As described above, according to an embodiment of the present invention, the transmitting-side apparatus is configured to individually carry video, audio, and data signals by the respective RTP packets, instead of using an MPEG-2 TS multiplexing method. When the transmitting-side apparatus is configured as shown in FIG. 3, the MPEG-2 TS is not used, so that it is unnecessary to transmit program clock reference (PCR) information which is periodically transmitted. The PCR information is transmitted largely for two purposes as follows:

1) Preventing a buffer of a receiving terminal from being empty or from overflowing when there is an error in precision between an oscillator generating a clock in a transmitting terminal and an oscillator generating a clock in the receiving terminal; and 2) Causing a plurality of receivers to all have the same clock.

When the MPEG-2 TS is not used, it is necessary for another component to perform these functions. According to an embodiment of the present invention, the function of the PCR may be replaced by the object clock reference (OCR) included in the MPEG-4 SL. Although the OCR originally is clock information used when a decoding operation is performed, the OCR may be extracted and used to synchronize a system clock and to control a buffer. Such a configuration will be described in more detail with reference to FIG. 4.

Figure 4:
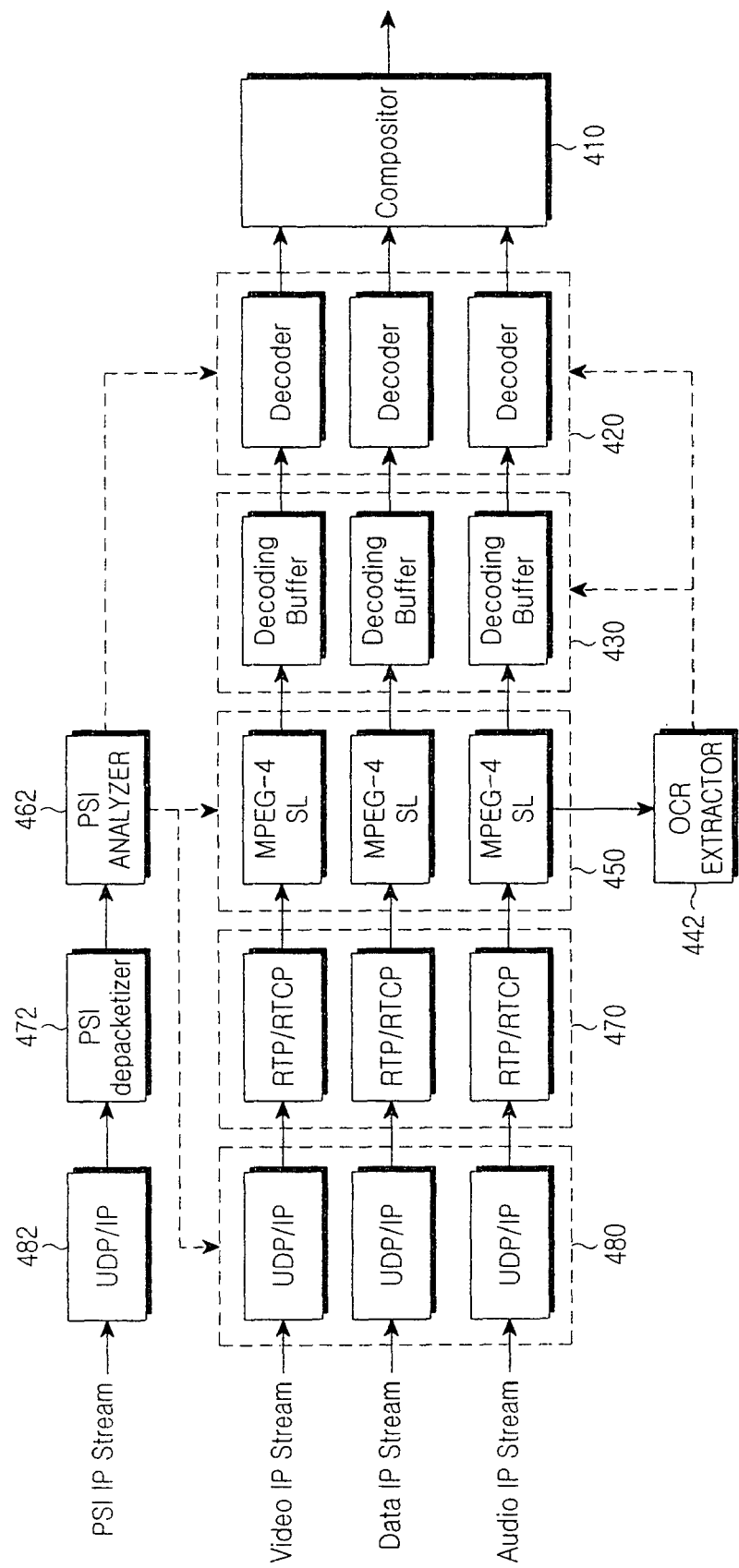
FIG. 4 is a block diagram schematically illustrating the configuration of a receiving-side apparatus for terrestrial DMB signals according to an embodiment of the present invention.

FIG. 4 is a block diagram illustrating the configuration of a receiving-side apparatus according to an embodiment of the present invention. A client-side receiver, which is connected to the IP packet transmitting-side apparatus as shown in FIG. 3 via a wired/wireless network (e.g., a Wibro network), first receives PSI information via a known port. By analyzing the PSI information, the receiver can obtain information about ports for video, audio, and data signals. Through the obtained ports, the receiver receives the video, audio, and data signals.

Since the transmitting side synchronizes the video, audio, and data signals by means of one reference clock, it is preferred that the transmitting side transmits OCR information through one of the video, audio, and data signals. In addition, since the video signal includes a large amount of data, and there are many cases of not using the data signal, it is proper that the audio signal carries the periodic OCR information. However, it is not essential that the audio signal should carry the OCR information. FIG. 4 illustrates the configuration of the receiving-side apparatus on the assumption that an audio signal carries OCR information, in which an OCR extractor uses extracted OCR information in order to synchronize a system clock and to control buffers and decoders.

In more detail, among a video IP stream, an audio IP stream, a data IP stream, and a PSI IP stream, which have been transmitted from the transmitting-side apparatus as shown in FIG. 3, the PSI IP stream is provided to a PSI UDP/IP depacketizer 482 through a known port, so as to be depacketized. The output of the PSI UDP/IP depacketizer 482 is provided to a PSI depacketizer 472, thereby being depacketized into original PSI information. Thereafter, a PSI analyzer receives and analyzes the PSI information, thus obtaining information about input ports for the video, audio, and data signals.

Then, the video IP stream, audio IP stream, and data IP stream received through the input ports are individually depacketized by a UDP/IP depacketizer 480, and then are individually RTP/RTCP-depacketized by an RTP/RTCP packetizer 470. Thereafter, the RTP/RTCP-depacketized streams are provided to an MPEG-4 SL decapsulator 450 so as to be individually decapsulated, and then are individually stored in a decoding buffer 430. Thereafter, the data stored in the decoding buffer 430 is provided to a decoder 420 so as to be converted into original video, audio, and data information, and then is provided to a compositor 410, thereby being output as an original composite signal.

In this case, the OCR extractor 442 extracts OCR information, which is provided together with audio data to the MPEG-4 SL decapsulator 450, and synchronizes a system clock and controls the decoding buffer 430 and decoder 420 by means of the extracted OCR information.

Having thus described an embodiment of a method and system for retransmitting an Internet protocol packet for terrestrial digital multimedia broadcasting service, it should be apparent to those skilled in the art that certain advantages of the system have been achieved. As described above, the method and system for retransmitting an Internet protocol packet for terrestrial digital multimedia broadcasting service according to an exemplary embodiment of the present invention does not use an MPEG-2 TS, which is used when a terrestrial DMB signal is IP-packetized in the prior art, thereby simplifying the configuration of the system. In addition, according to an exemplary embodiment of the present invention, it is possible to reduce inefficiency caused by the duplicated functions of MPEG-4 SL and MPEG-2 TS.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A system for retransmitting an Internet protocol packet for terrestrial digital multimedia broadcasting (DMB) service, the system comprising:
a transmitting apparatus for:
encoding video, audio, and data information according to an MPEG-4 scheme,
individually encapsulating the encoded information into corresponding MPEG-4 synchronization layers (SL), and
individually carrying the encapsulated video, audio, and data information, together with Program Specific Information (PSI), by packets of an RTP/RTCP (Real-Time Transport Protocol/Real-Time Transport Control Protocol) scheme, wherein a single object clock reference information (OCR) is added to one of the video, audio, and data information to be transmitted; and
a receiving apparatus for receiving each of the packets from the transmitting apparatus, and performing a decapsulation based on the RTP/RTCP scheme, an MPEG-4 SL decapsulation and a decoding with respect to each received packet, thereby restoring the original video, audio, and data information for the DMB service extracting the OCR information and using the OCR information for synchronization of a system clock and for control of a buffer containing corresponding data.

2. The system as claimed in claim 1, wherein the transmitting apparatus adds the OCR information to the audio information to be transmitted.

3. The system as claimed in claim 1, wherein the transmitting apparatus comprises:
a video encoder, an audio encoder, and a Binary Format for Scene (BIFS) generator for receiving the video, audio, and data information and generating video, audio, and BIFS data based on an MPEG-4 scheme, respectively;
an encapsulator for individually encapsulating the video data, audio data, and data information, which have been generated by the video encoder, the audio encoder, and the BIFS generator, into an MPEG-4 synchronization layer (SL); and
an RTP/RTCP packetizer and a UDP/IP packetizer for individually converting each output of the encapsulator and the PSI into packets based on the RTP/RTCP scheme, and transmitting the packets as a video IP stream, an audio IP stream, a data IP stream, and a PSI IP stream.

4. The system as claimed in claim 3, wherein the receiving apparatus comprises:
- a PSI UDP/IP depacketizer for receiving and depacketizing the PSI IP stream from the video IP stream, the audio IP stream, the data IP stream, and the PSI IP stream transmitted from the transmitting apparatus;
- a PSI depacketizer for depacketizing an output of the PSI UDP/IP depacketizer to obtain the original PSI;
- a PSI analyzer for analyzing the PSI output from the PSI depacketizer;
- a UDP/IP depacketizer and an RTP/RTCP depacketizer for individually depacketizing the video IP stream, the audio IP stream, and the data IP stream in the RTP/RTCP scheme;
- a decapsulator for performing an MPEG-4 SL decapsulation with respect to each output of the RTP/RTCP depacketizer, and storing each piece of data decapsulated by the decapsulator in a decoding buffer;
- a decoder for converting each piece of data stored in the decoding buffer into the original video, audio, and data information; and
- an OCR extractor for extracting the OCR information from an output of the decapsulator.

5. The system of claim 1, wherein the receiving apparatus system clock is synchronized to a system clock of the transmitting apparatus system clock using the OCR information.

6. A method for retransmitting an Internet protocol packet for terrestrial digital multimedia broadcasting (DMB) service, the method comprising:
- individually encoding, by a transmitting apparatus, video, audio, and data information according to an MPEG-4 scheme, individually encapsulating the encoded video, audio and data information into corresponding MPEG-4 synchronization layers (SL), and individually transmitting each of the encapsulated video, audio and data information, together with Program Specific Information (PSI), by packets of an RTP/RTCP (Real-Time Transport Protocol/Real-Time Transport Control Protocol) scheme wherein a single object clock reference information (OCR) is added to one of the video, audio, and data information to be transmitted; and
- decapsulating, by a receiving apparatus, each packet received from the transmitting apparatus according to the RTP/RTCP scheme, and performing an MPEG-4 SL decapsulation and a decoding with respect to each packet decapsulated according to the RTP/RTCP scheme, thereby restoring the original video, audio, and data information for the DMB service by extracting the OCR information and using the OCR information for synchronization of a system clock and for control of a buffer containing corresponding data.

7. The method as claimed in claim 6, wherein the transmitting apparatus adds the OCR information to the audio information to be transmitted.

8. The method of claim 6, wherein the receiving apparatus system clock is synchronized to a system clock of the transmitting apparatus system clock using the OCR information.

9. An apparatus for retransmitting an Internet protocol packet for terrestrial digital multimedia broadcasting (DMB) service, comprising:
- an encoder encoding video, audio, and data information according to an MPEG-4 scheme;
- an encapsulator individually encapsulating each of the encoded information into corresponding MPEG-4 synchronization layers (SL) packet;
- a RTP/RTCP packetizer individually packetizing each of the encapsulated packet and individually carrying the encapsulated packet, together with Program Specific Information (PSI), according to RTP/RTCP (Real-Time Transport Protocol/Real-Time Transport Control Protocol) scheme; and
- a UDP/IP packetizer coupled to an output of the RTP/RTCP packetizer generating a video IP stream, an audio IP stream, a data IP stream, and PSI IP stream, wherein a single object clock reference information (OCR) is added to one of the video, audio, and data information to be transmitted information, the OCR being used to provide synchronization with a receiving device.

10. The apparatus as claimed in claim 9, wherein the UDP/IP packetizer converts the PSI into packets based on the RTP/RTCP scheme generating a PSI IP stream.

* * * * *

UNITED STATES PATENT AND TRADEMARK OFFICE
CERTIFICATE OF CORRECTION

| | | |
|---|---|---|
| PATENT NO. | : 8,009,742 B2 | Page 1 of 1 |
| APPLICATION NO. | : 11/900873 | |
| DATED | : August 30, 2011 | |
| INVENTOR(S) | : Sung-Kee Kim et al. | |

It is certified that error appears in the above-identified patent and that said Letters Patent is hereby corrected as shown below:

Column 6, Claim 1, Line 37 should read
-- ...reference (OCR) information is added to one... --

Column 7, Claim 6, Lines 39-40 should read
-- ...clock reference (OCR) information is added to one... --

Column 8, Claim 9, Line 34 should read
-- ...clock reference (OCR) information is... --

Column 8, Claim 9, Line 36 should read
-- ...transmitted, the OCR information being used... --

Signed and Sealed this
First Day of May, 2012

David J. Kappos
*Director of the United States Patent and Trademark Office*